United States Patent
Gupta et al.

(10) Patent No.: US 6,513,059 B1
(45) Date of Patent: Jan. 28, 2003

(54) ADAPTIVE COLLABORATIVE INTELLIGENT NETWORK SYSTEM

(75) Inventors: Pradeep Gupta, Milpitas, CA (US); Dmitri Kondratiev, Moscow (RU)

(73) Assignee: Cambira Corporation, Santa Clara, CA (US)

( * ) Notice: Subject to any disclaimer, the term of this patent is extended or adjusted under 35 U.S.C. 154(b) by 0 days.

(21) Appl. No.: 09/648,299

(22) Filed: Aug. 24, 2000

(51) Int. Cl.[7] ............................................... G06F 15/16
(52) U.S. Cl. ....................................................... 709/202
(58) Field of Search ................................ 709/202, 203, 709/249

(56) References Cited

U.S. PATENT DOCUMENTS

| | | | |
|---|---|---|---|
| 6,134,548 A | * 10/2000 | Gottsman et al. | 707/5 |
| 6,199,099 B1 | * 3/2001 | Gershman et al. | 709/203 |
| 6,275,859 B1 | * 8/2001 | Weseley et al. | 709/229 |
| 6,356,905 B1 | * 3/2002 | Gershman | 707/10 |
| 6,401,085 B1 | * 6/2002 | Gershman et al. | 707/4 |

* cited by examiner

*Primary Examiner*—David Y. Eng
(74) *Attorney, Agent, or Firm*—John F. Schipper

(57) ABSTRACT

System and method for facilitating exchange of information on a computer network, such as the Internet. The system provides one or more context trees, with each tree including two or more connected nodes, each node being associated with one or more selected node objects. Associated with each node is a blackboard for receiving and making available for reading, messages concerning the node object, a knowledge base containing information, facts, constraints and-or rules (Rules) concerning the node object, and an inference engine providing at least one logical rule that can be used to infer a logical conclusion based on at least one Rule in the knowledge base. A tree has a collection of at least two mobile intelligent agents that are configured to facilitate exchange of information on a node object, between two agents or between a node and an agent. An agent may migrate from a first node to a second node connected to the first node. An agent, by subscribing to the Rules of a node, is permitted to post a message on, and to read a message posted on, a blackboard for the subscribed node. The collection of agents has at least one tree agent that has knowledge of nodes that are directlz connected to each node in the tree.

34 Claims, 6 Drawing Sheets

ADAPTIVE COLLABORATIVE INTELLIGENT NETWORK SYSTEM

FIELD OF THE INVENTION

This invention relates to use of intelligent collaborative mobile agents in a computer network.

BACKGROUND OF THE INVENTION

Present day Internet or web-applications are focused on providing easy information access to users. This model focuses on providing standardization of ubiquitous connectivity, information exchange, and presentation of information to the user. The rapid adoption of Internet is perhaps the most significant event in the $21^{st}$ century, sometimes referred to as a networked economy. More importantly, the potential scope, size and overall economic impact of this economic system is much larger than what we can comprehend today.

The key characteristics that distinguish the new networked economy are information, knowledge and speed. In the traditional economy, companies rely on physical assets to create value, and have often owned the value chain to minimize the risk of relying on others. In the new economy, companies are relinquishing ownership of most of the value chain activities. Instead, many companies are relying on real-time information and customer knowledge and are leveraging Internet based partnerships with suppliers and contract manufacturers to do business in the most productive and efficient manner. The secrets of success involve "knowledge exchange" with trading partners, knowing and fulfilling customer needs, anticipating future requirements, and using real-time intelligence to deliver products and services that meet the customer needs.

With the proliferation of businesses on the Internet, mobile appliances and integration of computing and communications technologies, next generation networks are needed that intelligently automate business to business or personal collaboration on the Internet such that high-levels of automation can be achieved to streamline business functions, cross-enterprise business processes, and personal applications.

Next generation Internet applications and systems require making information and intelligent services accessible to computers (and people) so that the network can adapt to or evolve with new concepts including business and personal environments to better reflect real-life environments. These services will be provided by a computer-to-computer communication network that is highly adaptive to real business or personal environments, thereby providing a real-time, information and knowledge and speed to make business and personal users work efficiently in this new networked economy. Such automation of complex application systems requires a shared ontology and intelligent agents as part of a system that closely reflects a knowledge based system.

Information architecture is a central issue for implementing next generation computer-connected systems. In particular, the following issues have to be taken into account: (a) networked companies represent large scale, inter-networked information spaces; (b) lack of business to business collaboration, and automation via intelligent computer network, still requires substantial human intervention and doesn't accurately reflect the real-time context of the business or personal environments; (c) standardization of business models, processes, and knowledge architecture is critical to achieving return on investment; (d) the variety of enterprise systems deployed, configured and used cause real problems; interoperability problems are acute when partners attempt to agree and define standards for interoperation; (e) standards are hard to achieve, particularly in cross-industry initiatives, where companies co-operate and compete with each other; (f) commercial practices vary widely (technical, practical, organizational and political); (g) describing an organization in terms of products, goods, services and interactions is a formidable task; and (h) adopting a single common standard can limit the business models deployed Similarly, in personal information architectures in commerce or other applications, there is lack of consistent knowledge representation and limited automation of personal services and applications and a lack of interoperability across devices to provide ubiquitous service delivery.

What is needed is a next generation intelligent network of active knowledge space(s), including a system of intelligent, autonomous, adaptive, mobile, collaborative and adaptive agents that can be created, deleted and/or altered to perform several different tasks within a changing environment. Preferably, the agents should be able to work across different domains, using a common language and common programming applications. Preferably, the agents should be capable of representing commercial clients (buyers, sellers, traders, service providers, manufacturers, etc.), and existing business systems and should be capable of automating and delivering services via collaboration to the end-users, that can then be viewed in browsers or other display devices.

SUMMARY OF THE INVENTION

The field of the present invention relates to an Awit Space—a multi agent system (MAS) and living/evolving system for active knowledge representation and exchange on the Internet. In the context of this document, an agent is a software component that acts as a client's representative or set of application/domain components, and/or system service and with authority from the client to interact in multiple active knowledge spaces distributed on the Internet according to some problem domain. An Awit Space provides a collaborative environment for its agents, referred to as Awits, and supports secure distributed application model with public key encryption and authentication. An Awit Space is a distributed programming architecture with persistent state and support for agent mobility. An Awit Space is an Internet multi-agent system that provides a collaborative environment for the new generation of Internet applications in business and personal applications. Current Internet application servers from different vendors and other third-party solutions may be integrated in this networked environment to collaborate and to provide services to end-users (business or personal applications).

Just as Java provides a virtual machine for handling different computing environments, an Awit Space provides a virtual rational machine for distributed knowledge processing that supports both mobile data, such as concepts (facts, constraints and rules, referred to collectively as "Rules" herein), and mobile code, expressed in ASpeak, for knowledge representation and agent communication language.

Additionally, the run-time system provides for system-level Awit agent groups and families that implement leasing, encryption, security, and other services such that semantic messages could be interpreted and executed at a context node. An Awit Space provides for replication of context node(s) to support redundancy and scalability needs. The result is a distributed system that supports a fluid configuration of intelligent agents and context nodes where operations can be performed anywhere on the Internet, according to the needs of a collaborative environment. In addition to the node services such as encryption, replication and quality of service (QOS) policies, context nodes can provide other services or new policies to collaborating intelligent agents. An Awit Space exploits these characteristics provided in the system to simplify the construction of a distributed system consisting of heterogeneous computing environment and services. Awit Spaces provide the infrastructure to add and extend existing concepts which allows agents to collaborate to solve application goals. Adding and extending concepts and intelligent agents are easy and natural procedures, while the system continues to support existing applications. Awit Spaces are far more dynamic than is currently possible in data-processing based traditional systems.

An Awit Space-based system federates computers, computing devices, applications (e.g., enterprise, e-commerce, marketplaces, etc.) into what appears to user as a single system that relies on existence of network connecting these computers, devices, protocol, services, and applications. Some devices in Awit Space federations may require more computing and network bandwidth, such as devices that host context nodes, and others can do with much less. Awit Space-enabled applications and services can be distributed in an n-tier architecture, where infrastructure components pertaining to systems and application logic could be deployed on more high-end computers with high-speed network support, while the user-agents could run on appliances or mobile phones. Awit Spaces can also support other application systems or multi-agent systems by providing a "proxy" Awits. When integrating large non Awit Space applications, a proxy (Awit) could implement various integration functions and can provide the interface to another Awit Space that performs both data integration model and protocol conversion.

A set of definitions of often-used terms is set forth at the end of this development.

DESCRIPTION OF BEST MODES OF THE INVENTION

Figure 1:
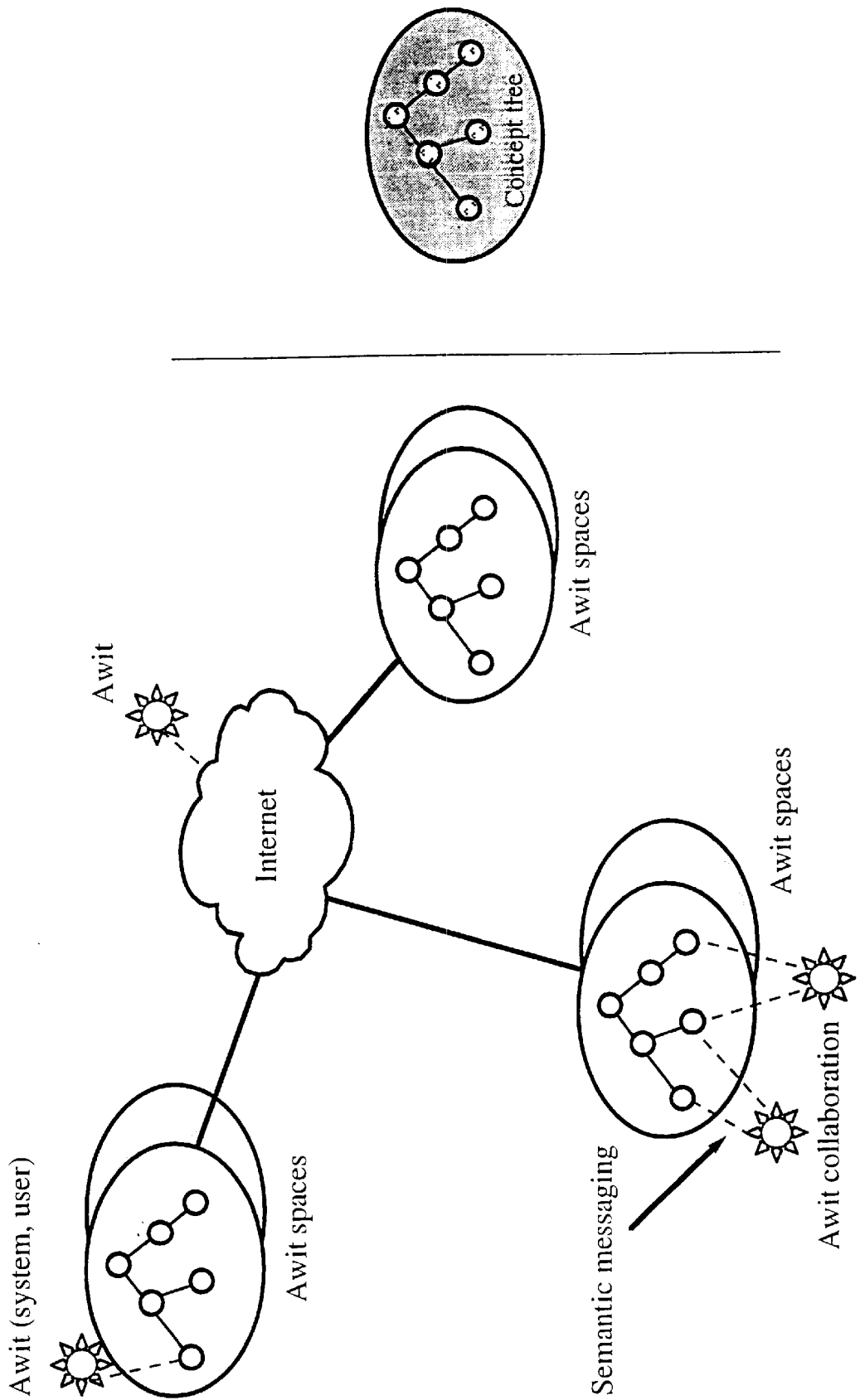
FIG. 1 illustrates logical architecture of an Awit Space.

An Awit Space is an Internet system based on the idea of federating a group of intelligent agents and knowledge spaces to provide multi-agent solutions that automate business and personal applications in a changing or evolving environment. The overall goal is to turn the Internet into a flexible personal collaborating network of adaptive application systems that can be made to automate business to business or personal collaboration. A goal of the system is to make Internet application more dynamic entity that better reflects the dynamic nature of changing business or personal networks in commerce, enterprise, or personal applications by enabling the ability to add, delete or modify concepts in knowledge spaces and intelligent agents flexibly, both as concepts evolve by the system or applications or by the user.

An Awit Space-based system includes the following parts: (a) a set of components that provides an infrastructure for federating Awit Space based applications or services in a distributed system; (b) a programming model that supports and encourages the production of reliable distributed applications or services (c) applications and services that can be made part of the federated Awit Spaces that offer functionality to any member of the federation. Although these pieces are separable and distinct, they are interrelated, which can blur the distinction in practice. The components that make up the Awit Spaces infrastructure and the Awit Space programming models, and services that reside within the infrastructure, also use that model; and the programming model is supported by components in the infrastructure. The end goals of an Awit Space span a number of different audiences. These goals include the following: (a) enabling applications to use intelligent agents and knowledge spaces over the network; (b) providing intelligent agents easy access to knowledge spaces anywhere on the network, while the knowledge spaces are evolving; (c) simplifying the task of building, maintaining, altering and deploying Awit based applications or services; and (d) simplifying the task of integrating existing systems.

An Awit Space extends a traditional multi-agent system by providing these important concepts: (a) knowledge spaces that provide context (an instance of concept in place, time, etc); (b) agents that always communicate via context nodes; (c) a virtual rational machine for agents to collaborate and perform tasks by executing agent programs in context nodes via semantic messages; and (d) runtime environment and services that support a heterogeneous computing environment. An Awit Space approach for next generation collaborative Internet applications includes: (a) an ontology that can adapt to evolving, live concepts and distribution of a shared ontology; (b) use of a consistent naming scheme; (c) support for context with place and time constraints; (d) provision of a context-based multi-agent system (MAS); and (e) composition/co-ordination models to handle complex distributed business or personal applications.

The multi-agent architecture used herein is based on a hub-and-spoke principle, whereby evolving and changing knowledge is an integral part of a context node, serving as a hub, with Awits serving as the spokes. An Awit communicates with other Awits by means of a mechanism (a blackboard) provided by a context node. A new concept may be added to, evolve with, and become an integral part of a context node.

Traditional peer-to-peer (direct agent-to-agent) communication architecture requires replication of knowledge so that any change in required knowledge would have to be coordinated with all copies of agents in the system. Where an agent creates another agent in the same or different context in a traditional architecture, providing mobility in a workflow or multi-agent collaboration is not very cost-effective for message delivery, and this action increases the cost of managing workflow and coordination. In a hub-and-spoke architecture, a hub automates workflow and coordination, thereby making the spokes (Awits) more efficient.

A hub-and-spoke multi-Awit system can adapt to changing concepts quickly. An Awit's activity and knowledge at a context node can be decoupled. A traditional agent collaboration network will integrate the knowledge and the agents that communicate with each other, resulting in a peer-to-peer communication system In the approach of this invention, a hub (context node) provides automatic change notification for the Awits that subscribe to that node.

Component Descriptions

An Awit Space is a collection of loosely coupled active knowledge spaces or context trees reflecting semantic structure of some set of problem domains on the Internet. An Awit Space represents live knowledge, based on the definition of 'context' as an instance of some concept at a specified time and/or place, or concept snapshot, shared on the Internet by software agents collaborating in some problem domain. Use of an Awit Space ensures one to one correspondence between concept category tree and context tree/space at any moment in concept live time. Thus, an Awit Space includes one or more context trees, a set of distributed knowledge spaces on the Internet, and agents cooperating in this environment. The main components of an Awit Space fall into three categories: infrastructure, a programming model that is supported by ASpeak (a high level agent programming language) and distributed applications built with the infrastructure and/or the programming model. Infrastructure includes different Awit agent classes or Awit families and the environment where the Awits operate, communicate and collaborate, which is a collection of context trees, or a set of distributed Awit Spaces.

An infrastructure enables building of new distributed applications in a problem domain, represented on the Internet by an Awit Space, from existing applications and other information sources. In other words, an Awit Space allows creation of new distributed applications, from scratch as well as a federation of the applications existing on the Internet today. The programming model is a set of interfaces that enables the construction of these new applications with the help of Awits in an Awit Space environment. Awits and Awit Spaces, though distinct and separable, are intermingled to a great extent and work in close cooperation. This infrastructure can be a federation that represents a single domain or inter-domain or cross-domain network, where Awits collaborate to achieve business or consumer application goals. An Awit space can integrate existing Web applications or enterprise applications into this federation. Individual context nodes provide the infrastructure for transport of semantic messages and can support other systems, such as CORBA. All components in Awit Spaces communicate via semantic messaging (see below). The logical architecture of Awit Spaces is illustrated in FIG. 1.

The logical components of an Awit Space architecture include: (a) context nodes; (b) Awits; (c) Awit communication and collaboration infrastructure; (d) context tree; (e) Atools; and (f) an ASpeak language.

A context node models life, in a changing environment. A context node provides a communication medium for Awits that subscribe to that node. A context node and its knowledge base represents an Awit's understanding of the world, or context (an instance of concept in time and place) from the perspective of the subscribed node at a moment in time. JAVA/RMI, XML and WAP, among others, provide a communications environment for nodes in a distributed context tree.

Figure 2:
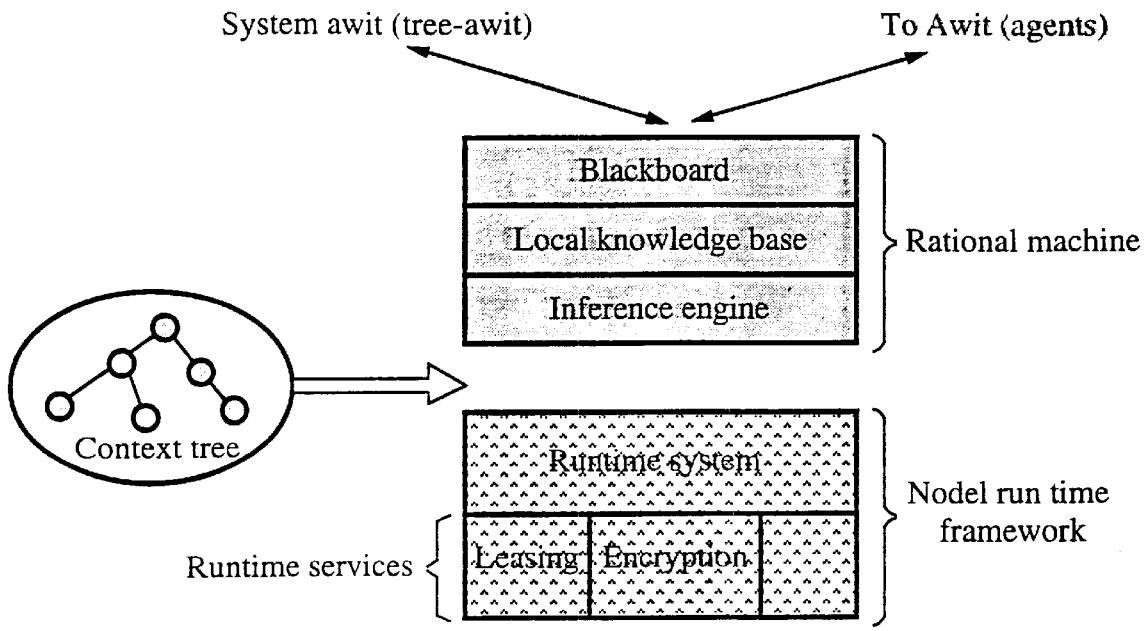
FIG. 2 schematically illustrates context node components and primary components of a rational machine.

A context node includes the following components: (a) a blackboard (b) a Rational Machine (c) a node Runtime Framework as illustrated in FIG. 2. Each of these components is described below.

A blackboard provides a message passing environment at a node and allows two kinds of Awits (system and application) to subscribe to messages with the given type. Awits communicate by posting and reading messages on the blackboard to which the Awits subscribe.

A Rational Machine, illustrated in FIG. 2, includes a blackboard (optional), a context knowledge base and a context inference engine. The Rational Machine works with facts, constraints and rules ("Rules") representing a live concept as an adaptive program in the given node. The context knowledge base is a concept fact database.

A node Runtime Framework provides services that: (a) maintain top-level context tree by adding/deleting concept sub-trees on request from application domain agents; (b) manage context node system by controlling blackboard operations associated with the node; (c) pass messages up and down the tree; (d) support persistent Awits state and persistent messages; (e) support Awits mobility among context nodes; and (f) support public key encryption and signing (authentication) of messages and Awits.

In physical space, every context node (or any sub-concept context node) may be replicated as needed across multiple locations to achieve high reactivity and reliability of the whole system. Modification of the state in any node replica results in propagation across all other replicas of this node.

A context node contains some part of specific domain knowledge. Context nodes form a live concept hierarchy tree. A node, by itself, has no knowledge of the concept tree to which the node belongs. A node only shares with other nodes ontology definitions used in the problem domain that node belongs to.

Concept nodes are wired into concept trees by Awits that have a view of some part of the concept hierarchy. Thus, any node can be wired by different (tree) Awits in different concept trees as described in the preceding sections. A context node also provides a communication media for Awits that subscribe to the node.

An "Awit" is an active wit, where wit refers to intelligence. An Awit represents an autonomous, mobile, intelligent, collaborative, adaptive software agent working in a "live" environment, a distributed, context-based knowledge space, where content is evolving constantly. Context spaces are actualizations of real world concepts in time, where a concept is defined in terms of an ontology for a given information domain. An ontology is specified by Rules and may be a specification of a conceptualization.

A network agent (an "Awit"), as utilized here, is an autonomous, mobile, intelligent, collaborative and adaptive software program that acts as a digital proxy for the client or user. An Awit can identify repetitive patterns of behavior, changes in patterns over time, and similarities between events, between reactions and between objects. An Awit is an active agent that can be programmed on the fly and that can create and assign tasks to other Awits, using a consistent agent programming language referred to as ASpeak. ASpeak normalizes user or application or system performatives (assigned tasks and responsibilities) in a consistent language, manages life cycles of Awits, and delegates authority. Two Awits can collaborate with each other and/or with an external system to achieve complex goals. An external system is represented in an Awit Space by means of one or more proxy Awits that integrate this system into an Awit Space.

In direct management of an agent, the agent does not act until the user provides an explicit and often detailed command, and the user often monitors the response to the command. The agent remains a passive entity until a command is received. Indirect management of an agent involves providing an agent with guidelines for accomplishing one or more tasks and allowing the agent to work independently or collaboratively with one or more other agents; the user does not exercise complete control and may, but need not, monitor the agent's progress. An Awit relies upon indirect management.

An Awit is preferably adaptive and observes and learns as it interacts or reacts to the Awit's environment so that the Awit's performance can improve over time. An adaptive agent might be characterized as a learning agent. An Awit is preferably reactive and perceives and responds in a timely manner to changes that occur within the Awit's environment.

An Awit is preferably collaborative and has the capacity to interact with and cooperate with one or more other Awits, using an agent communication language (FIPA ACL). An ACL is presently being developed by the Foundation for Intelligent Physical Agents (FIPA), which seeks to standardize some aspects of agent technology. Another ACL, Knowledge Query and Manipulation Language (KQML), is already in use. Two or more Awits with overlapping tasks will work together to determine which Awit will carry out different portions of a task and how the Awits will merge their information for presentation to the user(s).

An Awit is preferably mobile and can migrate in a self-directed manner from one network node to another to perform the Awit's assigned duties. These duties may involve gathering information at one or more nodes and/or balancing workload or network traffic. An Awit provides more functionality than is provided by the well known IBM definition of an intelligent agent (agency, intelligence, mobility).

Figure 3:
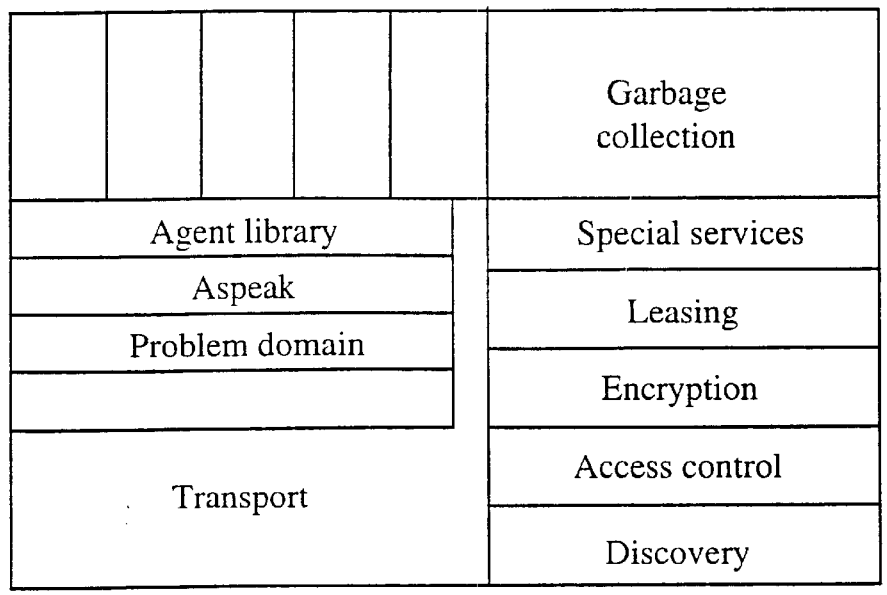
FIG. 3 is a schematic view of internal capabilities of an Awit.

An Awit is an autonomous, intelligent mobile software agent cooperating in solving some set of problems in the environment of a distributed context tree or trees. The logical architecture components of an Awit are illustrated in FIG. 3.

Awits do context 'wiring' by participating in one or more contexts. An Awit can participate in a context by receiving and/or sending messages to a subscribed node in that context. Message semantics is defined by some known problem domain in ASpeak syntax. To send/receive messages at a node, an Awit subscribes to a context node and its associated blackboard.

An Awit can participate in many context trees simultaneously. An Awit is a context tree 'life-form' that performs different roles in this eco system. An Awit plays two main roles, in addition to serving as a user Awit: as system/tree Awit and as application Awit.

Awit System Role. The functions performed by system or tree Awits include: (a) message passing among all nodes in the tree, including node replicas running in a different address space, as explained by the Awit communication and collaboration infrastructure discussion; (b) context tree maintenance; (c) node policies realization and execution; and (d) node policy negotiation and query.

Context Tree Maintenance. Context tree maintenance is performed by one or more tree Awits, which maintain a context tree by creating and/or deleting nodes on request from other Awits and by passing messages between nodes. These activities ensure the propagation of the new concept definitions in context tree that result from any of the following events: (a) context tree topology modification by addition or deletion of concept sub-trees; and (b) modification of the current Rules and/or changes to the state of the context knowledge base (KB) distributed among tree nodes.

Node Policies. One of the roles of a tree Awit is to realize and execute different context node policies. These policies are introduced into the node by new families or classes of tree Awits. When a node needs to support some new user-defined policy, a new family of tree Awits is developed and deployed in the node. Nodes in the context tree may support different set of policies or no policies at all. On the other hand, all node replicas are required to support the same subset of policies. This subset is negotiated among tree Awits in every node replica. Replication itself is a context node policy that may or may not be supported by a particular node. Replication uses negotiation of the other policies among all its replicas.

Other context node policies include: (a) message ordering and reliability policy, which defines quality of service (QOS) requirements for message passing between Awits operating in the node context; message passing policy may define Virtual Synchrony and its variations as requirements, or relax to allow unordered and/or unreliable messages; and (b) encryption policy, which defines node encryption requirements and includes encryption levels for messages coming through this node as well as for the node knowledge base data.

Node Policy Query and Negotiation. Tree Awits provide support for node policy query and negotiation. Policy query may be used by other Awits to define run-time properties of any context node. In addition, policy query and negotiation are used between two systems involved in the process of creating some context node replica in one of these two systems.

Leasing Service. An Awit Space can provide a leasing service that defines a grant of guaranteed access over a time period to service provided by other Awit or Awit group (an Awit family), further in this text for simplicity refered to as Awits. Each lease is negotiated between a user Awit and the Awits providing some service. A service is requested for some period; access is granted for some period, presumably taking the request period into account. If a lease is not renewed before it is freed, because the Awits are no longer needed, because the requesting Awit or Awit Space fails, or because the lease is not permitted to be renewed, the user Awit and the Awits providing this service conclude that this Awits service may be freed.

Awit Lifecycle, Composition and Garbage Collection. An Awit Space provides composition and lifecycle model for grouping agents to collaboratively perform application tasks, which together define the breakdown of application tasks, scheduling, co-ordination, life-cycle of tasks and transaction characteristics. Each Awit operates within one or more context nodes which act as a conduit for passing semantic messages in ASpeak) related to collaboration tasks. Two distinct composition models are supported in an Awit Space, namely Awit-based and context node-based. An Awit can compose or create Awits to support cloning/replication or creation of other Awits to fulfill application needs. The context nodes themselves can create new Awits that are required to adapt to evolving concepts.

Figure 4:
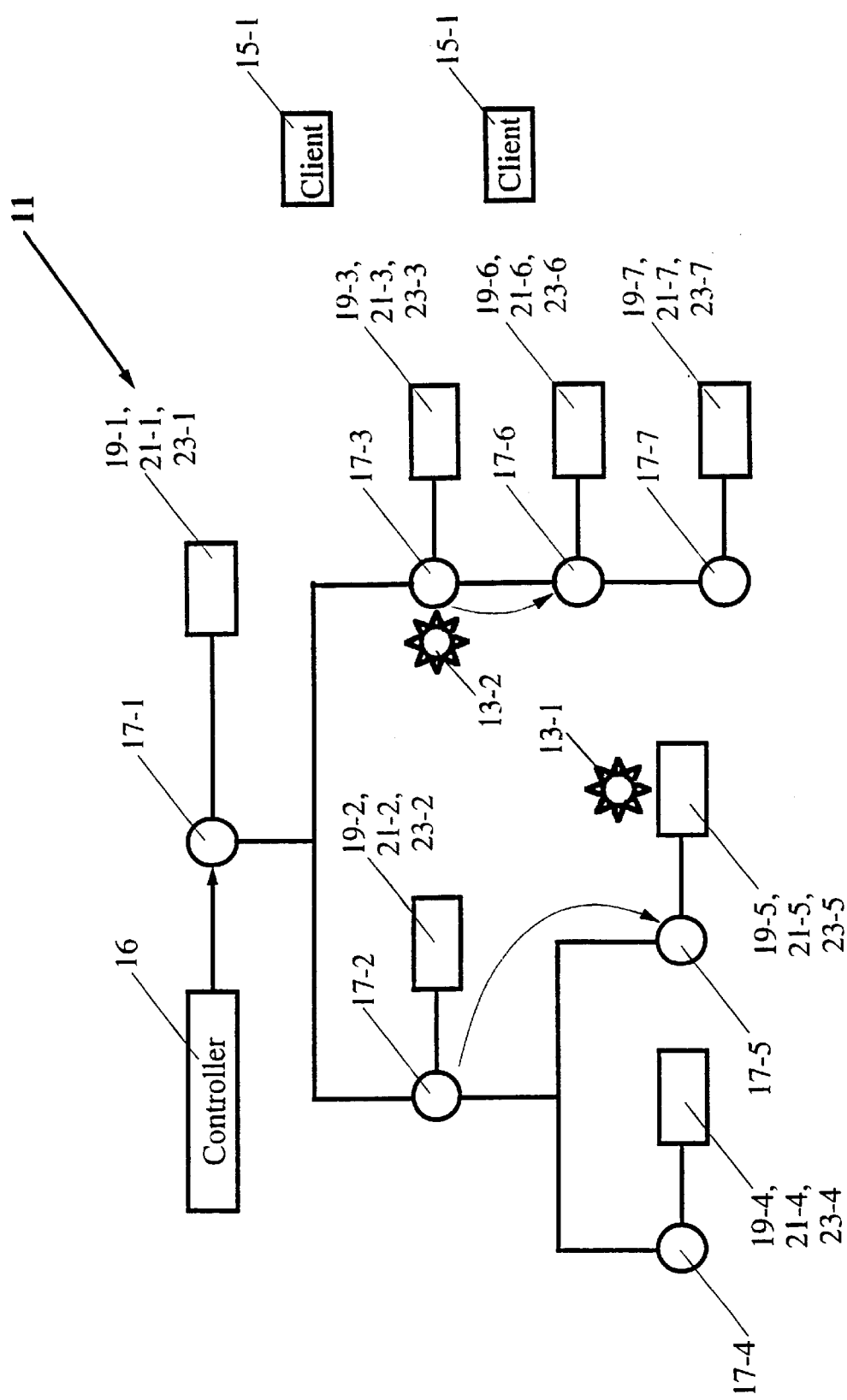
FIG. 4 illustrates a general environment in which a user utilizes an Awit to perform a specified task.

FIG. 3 illustrates an Awit's internal functions or capabilities. These include special services, such as leasing, encryption, grant of access, discovery (e.g., other agents), transport and "garbage collection." This last service concerns clean-up after an Awit has served its purpose and is terminated; certain residues that may have been left by the departed Awit must be identified and eliminated. Awit transport occurs, for example, when an Awit moves from node to node within a context tree, or from one context tree to another tree, as illustrated in FIG. 4. An Awit Space provides multiple life-cycle management model and is specified as policy during the creation of a Awit. Life-cycle policies can either be static or dynamic. The static policies are defined at the time of creation of Awits and are structured around task boundaries, and the dynamic life-cycle policies are defined via semantic messages among collaborating Awits. The static policies are useful in case of transient agents which are created for delegating a sub-task that is usually short-lived, whereas dynamic life-cycle policies are useful in case of long-lived transactions.

Awit Mobility. An Awit Space includes one or more context trees, bound together to address part or all of a problem domain. An Awit can move between individual context nodes, and hence become distributed throughout the tree or even between two or more context trees, as illustrated in FIG. 4. As discussed in the preceding, an Awit can serve as a systemltree Awit or as an application Awit and is programmed using ASpeak programming language. A semantic message encapsulates an ASpeak program to perform or facilitate Awit mobility. Because ACL is an integral part of an ASpeak program, an Awit uses ACL to perform or facilitate the mobility functions required for that Awit.

In order to move from one context tree node to another node, an Awit uses its associated program, which includes logic encapsulated as a sequence of ACL directives that has a source address and a destination address specified. A context nodes that receives these programs and directives as semantic messages uses the destination address to route the semantic message to the destination node. Upon receipt of the semantic message at the destination node, the programs are reassembled as an Awit. Using this mechanism, an Awit supports relaxed mobility and agent cloning.

Additionally, an Awit can assemble other Awits in its address space, using the same context, referred to as extensibility of an Awit.

Awit Application Role. Awit application roles are those roles that a distributed application defines for its components. The definition of these roles is a prerogative of an application itself. One example of an application is e-bazaar, a distributed, multi-agent e-commerce system that provides the following features. The e-bazaar system automates buying and selling of goods and services (products) in a multiple buyer/multiple seller environment using Awits. Each user Awit represents a buyer or a seller of a product and subscribes to one or more nodes at which an exchange transaction involving that product is being, or can be, negotiated. Each buyer Awit and seller Awit uses one or more algorithms to respond to a previous offer (buy or sell price) in a double-ended auction. Several buyers and/or several sellers may participate in the auction activities, and a node controller determines whether a strike price has been met and whether all other conditions of the proposed exchange are met. The buyer and/or seller Awits may have other constraints imposed (time limits, price limits, etc.), and these constraints may change with time.

An example will illustrate the Awit application roles. Awits provide a multi-agent e-commerce system based on the Awit Space reference architecture. Awit Spaces are used to implement a dynamic e-commerce environment adaptive to constantly changing real life trading conditions and configurations. The system: (a) automates buying and selling of products and solutions in a multiple buyer/multiple seller environement using intelligent agents (Awits); (b) enables infrastructure vendors to provide e-commercer based solutions either as a hosted service or as a software package for enterprises or net-market providers; (c) automates enterprises to integrate their products and solutions (e.g., catalogs) in front-office e-commerce systems (enterprise-portal) or net-markets (e-marketplaces or storefronts in e-malls); (d) enables net-market providers to define and implement transactional, advertisement, and other policies for products and solutions from multiple enterprises (product/solution vendors); (e) automates life-cycle management of policies to reflect real-life trading conditions and configurations; (f) enables buyers to automate buying and negotiating products and solutions that best meet buyers needs across enterprise-portals and net-markets; and (g) provides dynamic discovery and composition of solutions by aggregating multiple partners to buy or sell a solution.

Awit Communications and Collaboration infrastructure components provide the communications interface for transport of semantic messages to the context tree entities. This infrastructure can support multiple transports from CORBA, XML, WAP and others so that Awits can be deployed in heterogeneous computing networks, including servers, workstations, desktop machines, etc. These Awits can collaborate in any transport environment. A semantic message preferably uses XML to transport an Awit and the Awit's performatives (tasks and responsibilities).

Awit Spaces use "semantic messaging" as a short hand term for 'meaningful messages' in terms of ontology shared by all Awits in a particular Awit Space. Awits communicate with one another indirectly, through their environment or context nodes, by means of semantic messages. Messages are semantic in a sense that Awits use these messages to communicate the 'meaning' of the actions which is independent of an Awit execution environment. Message programatics are external to the syntax and semantics of the message and in fact imply or deal with 'mental' state of the communicating Awits and the state of context used in this communication. In an Awit Space, a context node models life and a changing environment. The principal requirement for all messages to be communicated via this environment is consistent with the assumption that messages never travel in vacuum without leaving any trace. A message changes the environment through which the message passes in time. A context node models this changing environment and may be regarded by an external viewer as an adaptive program with a distributed state. Not only can a state (program it memory contents or node knowledge base) be changed at any moment of the node life, but the node program itself can be changed by sending messages through this node.

To achieve this goal, a semantic message includes one or more logic objects, which are extensions of frame constructs well known in symbolic logic. Every logic object has two main parts, namely, logic object attributes and rules or logic methods associated with this logic object. Logic object attributes are specified as name-value pairs with associated constraints. The constraints can be defined for an individual attribute and across a set of attributes with a logic formula. Semantic messages support an addressing scheme based on the location of the addressee Awits in the context tree. The address is a fully qualified name (FQN) or an address for a context node plus Awit name. An Awit may subscribe to more then one context node at any time and thus may have different addresses to which to send a message. Thus, depending on the address used, a message may travel different routes before receipt by the addressee Awit. This means that different context nodes will participate in message delivery and thus change their own states.

An Awit is addressed using a naming scheme similar to URL, with a path syntax of |<root>|name1|name2, where "root" refers to the root of the present context tree and name1 and name2 are name components of a particular domain hierarchy, with the last (highest-numbered) name (here, name2) being the destination Awit's name. An address can have any number of name components representing the context tree hierarchy, depending upon the problem domain hierarchy. Group addressing is supported by use of wildcards (*) at any level. In order to send a message to all Awits operating at a specified node, the address used would be |node|*. In order to send a message to Awits in a different context tree (inter-domain communication or inter-enterprise), the address should identify the root of the destination context tree and the node address within the destination context tree. If no context tree differing from the present context tree is specified in the path syntax, the system Awit will seek a destination node within the present tree.

A message addressing scheme based on FQN supports group addressing that may be used in multi-cast messages. Both unicast and multi-cast messages can be sent to any node or subtree of the main tree, from leaf nodes toward the root node and in the opposite direction (toward leaf nodes) as well. An Awit can operate in one or more contexts by associating with individual context nodes through a subscription process. A context node uses an associated blackboard as a foundation for message communications. The blackboard provides a generic environment for multiple client representatives (Awits) to post and read messages. Each context node has a blackboard on which such messages are posted and read by subscribing Awits.

An Awit posts, and thereby sends, a message on a subscribed node's blackboard. An Awit reads (and thereby receives) messages at a subscribed node using a template that identifies topics of concern to the Awit and filters and discards all other messages. Each template specifies the topic(s) of concern and may be placed on a subscribed node's blackboard. A client may specify message topics using one or more templates. A template object compares each message posted on the blackboard with the topic(s) specified in the template.

In an Awit Space, system Awits perform message routing. Each context node has at least one client, a system Awit, referred to as a node controller, that is responsible for message routing. At any node, a system Awit can have 0 or 1 parent associations and can have 0 or more child associations. A system Awit can post messages at, or receive messages directly from, any context node. When a message is posted at a given context node with which the system Awit has associations, the Awit analyzes the destination address. If the message is intended to move upstream toward the root node, the Awit posts the message in a parent context node; otherwise, the Awit posts the message in a child mode (if such exists) or at a context node with which the Awit has a direct relationship. A message is recursively routed up or down a context tree to its ultimate destination.

An Awit Space models a multi-domain world where every Awit Space represents a domain by mean of a distributed context tree. Nodes of the tree represent partial domain knowledge and provide context for Awits to interoperate with shared ontology and its instances or domain facts changing in time.

System or tree Awits bind nodes in a context tree by subscribing simultaneously to child and parent nodes in the tree. Thus, a tree Awit exhibits some domain knowledge, namely the knowledge of parent/child relationship of two or more nodes. This knowledge is used by tree Awits to route messages addressed to other parts of the tree. A tree Awit handles messages addressed up the tree and down the tree by posting them to parent context node and to child context node, respectively, without the need for any other knowledge about the tree. This allows support truly distributed Awit Spaces without any central control or censorship.

A context tree models a problem domain where concept details evolve from the root node to concept sub-trees and eventually to leaf nodes. A context tree/space may be distributed in physical space or in a trivial case may exist in one location (in an address space of one computer). A context tree/space is a dynamic or active, living space adapting to concept evolution. Concept representation is based on the domain ontology shared by all nodes of the corresponding context tree. A context tree provides a framework for distributed, live concepts. A concept is live in a sense that a framework allows propagation of new definitions as the concept evolves in time. An Awit Space is a collection of one or more context trees, each acting as a distributed knowledge space on the Internet. The nodes of a context tree provide multiple, loosely coupled, active knowledge spaces, and an Awit can act, with the user's authority and instructions, in any or all of these knowledge spaces. A context tree models a problem domain, with details that evolve from root node toward the individual leaf nodes.

Representation of a concept in an Awit Space is based on domain ontology that is shared by the nodes of a corresponding context tree. A concept may evolve with time, and new or altered definitions may be propagated through the corresponding context tree.

An Awit can undergo "context wiring" by participating in one or more contexts, through receiving and sending messages at context tree nodes to which the Awit subscribes. A node to which an Awit subscribes represents the Awit's view of the world from that node. A node has little or no knowledge of the context tree to which the node belongs but does have knowledge of the shared ontological definitions used in the problem domain to which the node belongs.

Each node has an associated blackboard on which a subscribing Awit can post and read messages. An Awit can participate in many context trees simultaneously. An Awit may serve as an application and/or may play another role as part of a system or tree. In the system role, a (tree) Awit: passes messages among all nodes of a tree, including node replicas; helps maintain a context tree, through creating and/or deleting nodes upon request and through modification of the Rules and/or the local knowledge base that currently apply at a node; executes node policies; and negotiates node policies and queries. A replica node is required to support the same set of policies as does the node from which the replica node is created, and to add, delete and/or modify policies on the same basis. Replication is itself a node policy that may or may not be supported at a given node. Node replication in a context tree is illustrated in path 3 of FIG. 5. Thus, an application may be active in more than one domain, as an inter-domain application.

Figure 5:
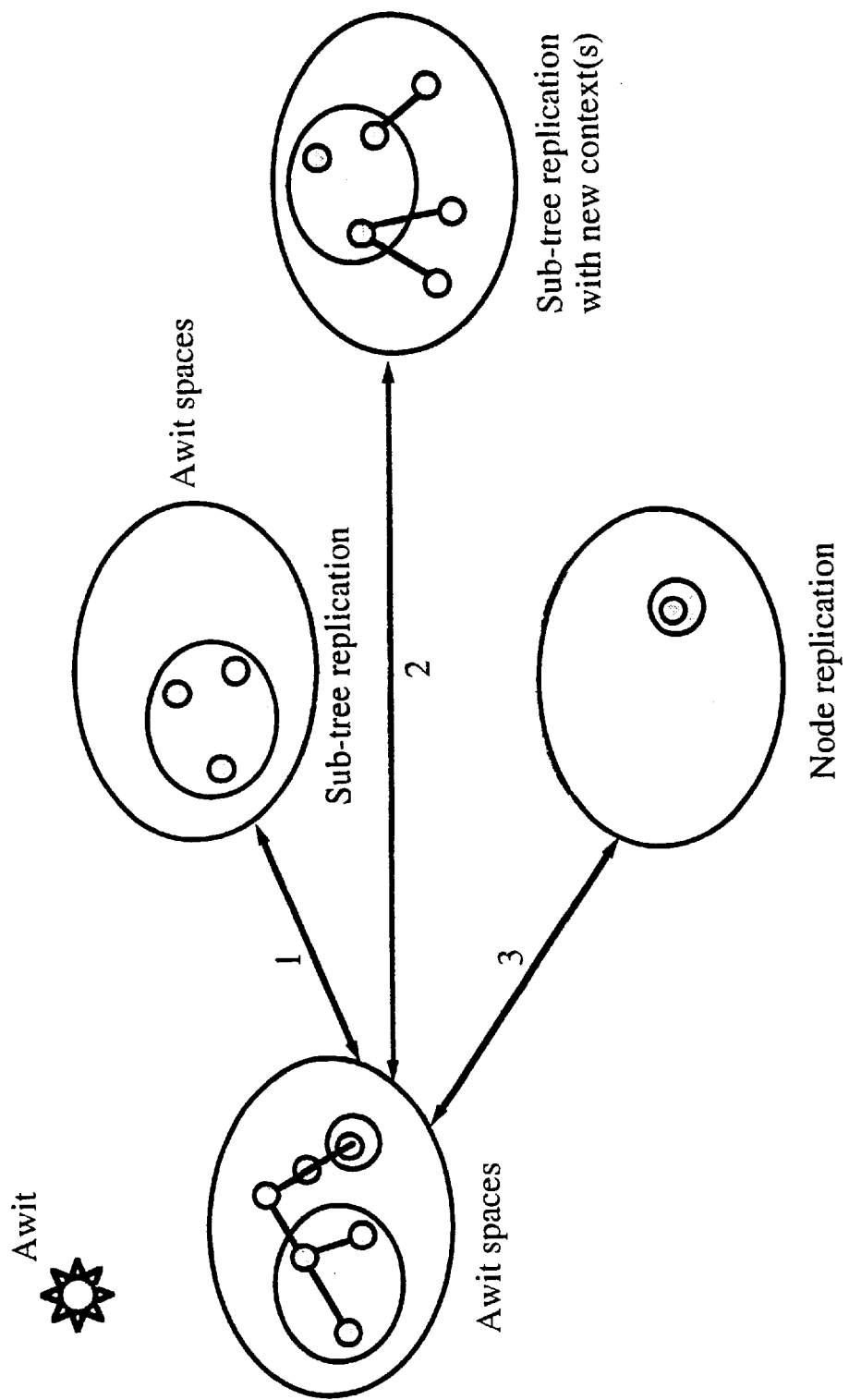
FIG. 5 illustrates node replication in a context tree.

FIG. 5 also illustrates replication of a sub-tree (path 1), or portion of a context tree, and sub-tree replication with one or more new contexts (path 2). An Awit, being mobile, may move from one context tree to another and may subscribe to nodes in more than one context tree.

In a physical space, every context node may be replicated as needed at multiple locations to maintain or improve reliability and to achieve high reactivity for the context tree system. A modification of the state of any node in a replicated group is replicated across the group.

Figure 6:
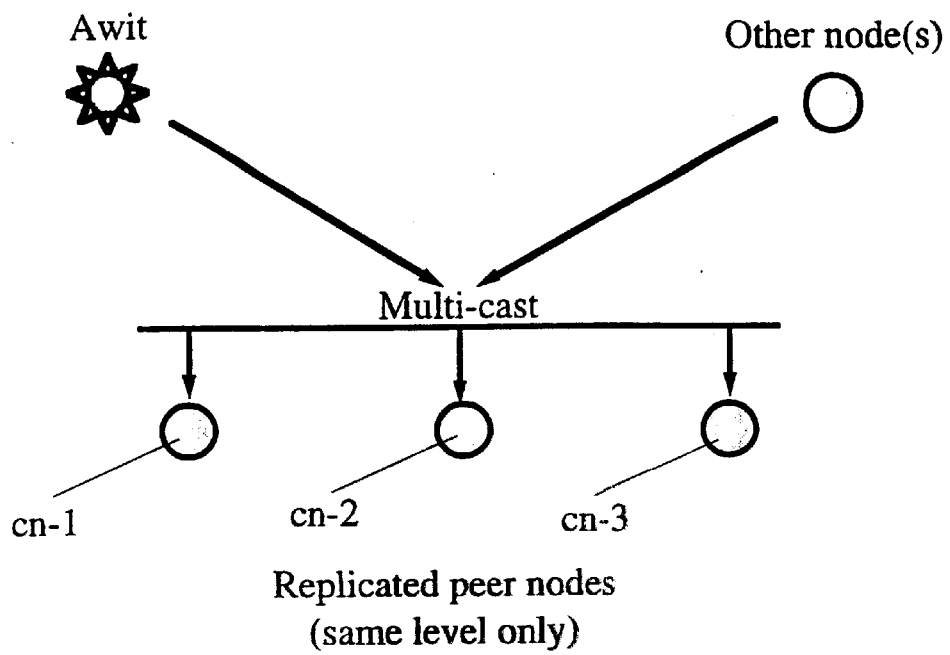
FIG. 6 illustrates delivery of a message to a node and its replica nodes.

Transport or delivery of a message, where a context node CN-1 has been replicated as one or more additional nodes, CN-2 and CN-3, is illustrated in FIG. 6. Where an Awit or another context node directs a message to the replicated node CN-1, the message is automatically formulated as a multicast message for the group of replicated nodes, CN-1, CN-2 and CN-3.

Figure 7:
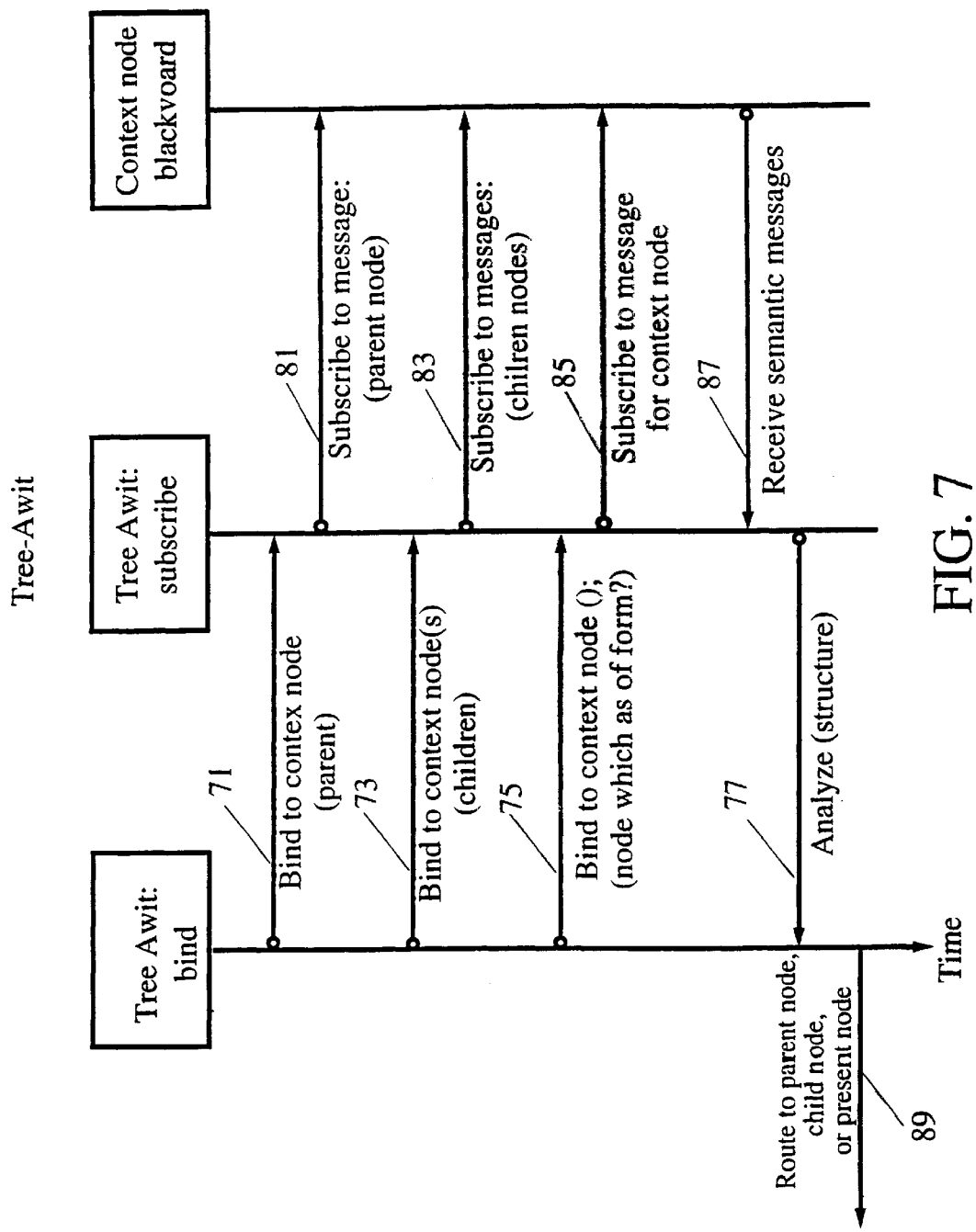

FIG. 7 illustrates a procedure for binding by or on behalf of a tree Awit to one or more context nodes on a tree. In steps 71, 73 and 75, which may be performed substantially simultaneously, a tree Awit at a given node binds to a parent node (if any), binds to one or more child(ren) nodes (if any), and binds to the present node, respectively. In step 77, the tree Awit analyzes the structure of the tree from the child-parent relationships leasmed by the tree Awit. In steps 81, 83 and 85, which may be performed substantially simultaneously, the tree Awit subscribes to messages at the present node, the parent node and the child(ren) nodes, respectively. In step 87, the tree Awit receives a semantic message to be routed to a particular node. Using the tree Awit's knowledge of the tree structure, the tree Awit routes the message to the present node, to the parent nodes or to a child node, depending upon the ultimate destination. Proceeding in this manner, the tree Awit provides routing services for at least one node on the tree.

Figure 8:
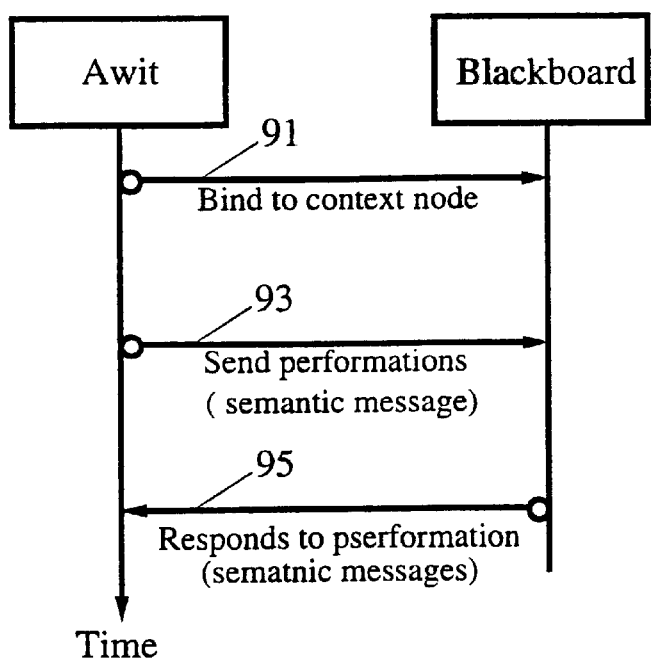
FIGS. 7 and 8 illustrate procedures for binding of a tree Awit and of a non-tree Awit to a context node.

FIG. 8 illustrates binding of a system or application Awit (not a tree Awit) to a node and subsequent furnishing of certain services at the node. In step 91, the Awit binds to a context node and subscribes to that node's Rules. In step 93, the Awit sends one or more perforrnatives to the blackboard at that node, preferably using semantic messaging. In step 95, the blackboard responds to receipt of the one or more performatives, preferably using semantic messaging.

A context node contains a part of the specific domain knowledge. Context tree nodes form a live concept hierarchy. However, a node itself has no knowledge of the context tree to which the node belongs. A node and its tree share ontology definitions used in the problem domain to which the node belongs.

Use of the invention is illustrated in FIG. 4 in a single context tree 11, in which two or more network agents 13-i represent different clients 15-i (i=1, 2, . . . ) in attempting to consummate a transaction. The context tree 11 includes a hierarchical structure of one or more nodes 17-j (j=1, 2, . . . ), each having a corresponding electronic blackboard 19-j upon which one or more messages can be posted, for example, by a first Awit 13-i, and read and responded to by a second Awit 13-i' (i≠i'). Each node 17-j also has a knowledge space 21-j and an inference engine 23-j, which have been discussed in the preceding. Each node 17-j has an associated set of facts, rules and constraints ("Rules") that are imposed by a (system) node controller 16 on any messages and/or related activities that are carried on at that node.

A context tree acts as a communications backbone for Awit communication and collaboration. The context tree includes individual context nodes that are wired together, using system Awits that are responsible for passing messages to, and receiving messages from, parent nodes and child nodes in the tree. A complete backbone is constructed across an Awit Space using this context wiring model. A message can be recursively routed in a loosely coupled sub-tree model across an entire context tree. In an Awit Space, a context node need not have knowledge of its domain hierarchy parent or child associations. Each node can evolve independently, and the context tree can evolve. New context nodes an be added and integrated into the context tree, to introduce new or modified concepts into the tree, thereby providing a highly open, configurable and adaptive environment for Awit communication and collaboration.

An ontology is an explicit specification of concepts in a problem domain. More formally, an ontology is a statement of a logical theory. In Awit Spaces, ontologies are defined as part of the ASpeak programming language. A common ontology defines a vocabulary with which queries and assertions are exchanged among Awits. An ontological commitment may be an agreement to use a shared vocabulary in a coherent and consistent manner. This commitment consists of facts, constraints, and rules that are defined by a domain expert in a given problem domain. The domain expert models a hierarchy of individual knowledge bases, that is, facts, constraints and rules that uniquely identify the concept. When viewed as a hierarchical structure, in a context tree, concepts evolve from a root node toward its member, where each member further specializes the concept. Hence, in Awit Spaces, each individual context tree has a local knowledge base. The ontology of a program is described by the representational terms used within the program. A context node's inference engine uses the knowledge base for providing services that support the concept. Because each context node itself has a inference engine, each node can add new or evolved concepts to itself, which may consist of updating the local knowledge base, and/or adding facts, constraints and/or rules as may be appropriate to derive a consistent logical state.

ASpeak. Awits are defined in terms of a high level programming language, ASpeak, that combines features of agent programming, shared ontology description and ACLs. ASpeak defines the ontology of a given shared domain in terms of the concepts or Rules (facts, constraints, and rules). An Awit is an ASpeak program(s) executed at one or more context nodes of a tree. Additionally, special programs known as context node controllers can also be developed for a given context node using ASpeak. An Awit may also create one or more new Awits to achieve specified goals, using ASpeak. General problem domain libraries are provided using ASpeak that may represent a application or domain, for example, a telecommunication inventory or telecommunication domain in which user agent tasks are defined using ASpeak, can be used to collaborate to provide user services. For example, an inventory application locates a fault on a telecom card and collaborates with a vendor to order replacement, where the user of the system would be notified of service-call to replace card.

ATools is a set of end user tools that facilitate assembly of domain applications from preconstructed ASpeak components. ATools provide Awit visualization and control. An Awit Library is an application programming library and platform-specific software development kit for creating collaborative applications and related software tools. An Awit Library contains preconstructed generic specifications for Awits, written in ASpeak; examples are wizards, configurator Awits and facilitator Awits.

What is claimed is:

1. A system for facilitating exchange of information on a computer network, the system comprising:

a context tree having at least first and second connected context nodes, with each node being associated with at least one selected node object and including a knowledge base containing at least one of information, a fact, a constraint and a rule, referred to collectively as "Rules," concerning the node object; and a collection of at least first and second mobile intelligent agents that are configured to exchange information concerning a node object between the agents and between a node and at least one or the first agent and the second agent, where the first agent, by subscribing to the Rules of a node, is permitted to post a message for the second agent at, and to read a message from the second agent at, the subscribed node, the collection of agents having at least one tree agent that has knowledge of structure of the tree and of all nodes that are directly connected to each node of the tree, and where at least one of the first agent and the second agent may migrate from the first node to a node directly connected to the first node, and where at least one of the first node and the second node, and an agent that subscribes to the at least one node, serve as a hub and a spoke, respectively, in communication within the tree.

2. The system of claim 1, further comprising a node change mechanism that receives and implements a change of at least one of said Rules at at least one of said nodes at a selected time.

3. The system of claim 2, wherein said change mechanism implements said change of at least one of said Rules at a time said change is received by at least one of said nodes.

4. The system of claim 2, wherein at least one of said change mechanism and said node at which said change is implemented implements a change, at a second selected time, in at least one of said agents that subscribes to said node.

5. The system of claim 1, wherein said collection of agents includes at least one controller agent that ensures that, if one of said agents subscribes to said Rules at said at least one node, said subscribing agent takes no action at said at least one node that is inconsistent with any of said Rules.

6. The system of claim 1, wherein first and second subscribing agents at said at least one node are assigned first and second tasks, respectively, concerning said node object, and the first and second subscribing agents collaborate to perform the first and second tasks.

7. The system of claim 1, wherein at least one of said first agent and said second agent has a capability of replicating at least one of said nodes.

8. The system of claim 1, wherein at least one of said subscribing agents posts a semantic message at said subscribed node.

9. The system of claim 1, further comprising:
a blackboard mechanism for receiving and making available for reading one or more messages concerning said node object; and
an inference mechanism providing at least one logical rule that can be used to infer a logical conclusion based on at least one Rule in said knowledge base.

10. The system of claim 1, further comprising:
a second context tree having at least first and second connected nodes, with each of the nodes being associated with at least one second tree node object and including a knowledge base containing at least one of information, a fact, a constraint and a rule, referred to collectively as "Rules" for the second tree, concerning the second tree node object; and
a second collection of at least third and fourth mobile intelligent agents that are configured to exchange information concerning a second tree node object between the third and fourth agents and between a node and at least one of the third and fourth agents, where the third agent, by subscribing to the Rules of the second tree node, is permitted to post a message for the fourth agent at, and to read a message from the fourth agent at, the subscribed second tree node, the collection of second tree agents having at least one second tree agent that has knowledge of structure of the second tree and of all nodes that are directly connected to each node of the second tree, and where at least one of the third agent and the fourth agent may migrate from the third node to a node directly connected to the third node, and where at least one of the third node and the second fourth and an agent that subscribes to the at least one node of the second tree serve as a hub and a spoke, respectively, in communication within the second tree.

11. The system of claim 2, wherein said at least one agent that serves as said spoke receives and implements a change of at least one of said Rules from said at least one changed node, which serves as said hub and which has received and implemented the change in the at least one of said Rules from said node change mechanism at said changed node.

12. The system of claim 11, wherein said at least one agent that serves as said spoke that has received and implemented said change of at least one of said Rules from said changed node delivers information concerning said change of at least one of said Rules to at least one node other than said changed node.

13. The system of claim 7, wherein, when at least one of said first and second agents replicates one of said nodes, the replicated node has a knowledge base with the same Rules as said node from which the replicated node was replicated.

14. The system of claim 8, wherein said subscribing agent expresses said semantic message in a language that is shared by said subscribed node and at least one other node.

15. The system of claim 9, wherein said first and second agents communicate with each other by posting and reading messages on said blackboard mechanism associated with at least one of said nodes.

16. The system of claim 10, further comprising a change mechanism that receives and implements a change of at least one of said Rules at at least one of said nodes of said second context tree at a selected time.

17. The system of claim 16, wherein said second context tree node communicates with at least one of said first and second nodes on said first context tree, and said second tree change mechanism implements a change of at least one of said Rules at said second context tree node in response to receipt of selected information from at least one of said first and second nodes on said first context tree.

18. The system of claim 1, wherein said context tree has at least a third context tree node, said first node serves as a parent node for and is directly connected to said second node, said second node serves as a child node for said first node, said second node serves as a parent node for and is directly connected to the third node, and the third node serves as a child node for said second node.

19. The system of claim 18, further comprising a node change mechanism, associated with said second node, that receives and implements a change of at least one of said Rules at said second node, wherein said second node communicates the information on the change in at least one of said Rules to at least one of said first node and the third node using at least one of said first and second agents.

20. The system of claim 19, further comprising a node change mechanism, associated with at least one of said first and third nodes, that receives and implements a change of at least one of said Rules at said first node and said third node, in response to receipt from said second node of information on said change of at least one of said Rules at said second node.

21. The system of claim 1, further comprising a runtime framework mechanism that receives and implements a change of said context tree by at least one of the following actions: (1) transport at least one selected information item from said first node to said second node; (2) add to said context tree a selected added group of one or more context nodes, connected to at least one of said first and second nodes, with each node in the selected added group being associated with at least one of said selected node objects and including a knowledge base containing at least one of said Rules concerning at least one node in the selected added group of nodes; (3) delete a selected deleted group of one or more context nodes from said context tree; (4) encrypt selected information exchanged by at least one of said agents; (5) decrypt information exchanged by at least one of said agents; (6) grant access by a selected agent to a selected node for a selected interval of time; (7) receive a statement of a selected lifetime for at least one of said agents and enforce the selected lifetime for the at least one of said agents; and (8) delete at least one information item associated with the at least one of said agents that has been terminated because of end of the lifetime for the at least one of said agents.

22. The system of claim 1, wherein at least one of said first agent and said second agent has a capability of replicating at least one of said first agent and said second agent.

23. The system of claim 1, wherein said first and second agents are configured to communicate with each other in at least one agent communication language drawn from a group of languages consisting of CORBA, XML and WAP.

24. The system of claim 1, wherein said first and second agents are configured to be transported from said first node to said second node in at least one agent communication language drawn from a group of languages consisting of CORBA, XML and WAP.

25. The system of claim 1, wherein at least one of said first and second agents is configured to be addressable by specifying said node at which said at least one agent has subscribed to said Rules of said node.

26. The system of claim 1, wherein at least one of said first and second agents provides at least one run time service, introduced at at least one of said first and second context nodes at run time and drawn from a group of services, associated with said context tree, consisting of garbage collection, leasing, encryption, security, access control and discovery.

27. The system of claim 26, wherein at least one of said first and second agents has a capability of upgrading said at least one provided run time service without affecting another of said run time services.

28. The system of claim 26, wherein said at least one provided run time service is implemented automatically.

29. The system of claim 1, wherein each of said first node and said second node is associated with a computer and a computer protocol, and the first node computer protocol is different from the second node computer protocol.

30. The system of claim 1, wherein each of said first node and said second node is associated with a computer and a computer protocol, and the first node computer is different from the second node computer.

31. The system of claim 1, wherein said first and second agents cooperate to perform a selected task at at least one of said first and second nodes.

32. The system of claim 1, wherein at least one of said first and second agents performs context wiring by transferring knowledge of an information item from said first node to said second node, where said at least one agent subscribes to said first and second nodes.

33. The system of claim 1, wherein at least one of said first and second agents is a tree that performs at least one of the following tasks: (1) passing of at least one message between said first and second nodes; (2) addition of at least one node to said context tree; (3) deletion of at least one node from said context tree; (4) negotiation of at least one of said Rules at at least one of said first and second nodes; (5) modification of at least one of said Rules at at least one of said first and second nodes; and (6) modification of said knowledge base associated with at least one of said first and second nodes.

34. The system of claim 1, wherein at least one of said first and second nodes receives and incorperates a change in said knowledge base of the receiving node and creates at least a third mobile intelligent agent that subscribes to the recieving node after the change in said knowledge base and that is permitted to post a message for at least one of said first and second agents at, and to read a message from at least one of said first and second agents at, the receiving node.

* * * * *